(12) United States Patent
Kim et al.

(10) Patent No.: US 8,703,399 B2
(45) Date of Patent: Apr. 22, 2014

(54) METHOD OF MANUFACTURING DISPLAY APPARATUS

(75) Inventors: Gwan-Soo Kim, Asan-si (KR);
Dong-Uk Kang, Suwon-si (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/439,505

(22) Filed: Apr. 4, 2012

(65) Prior Publication Data
US 2013/0100386 A1 Apr. 25, 2013

(30) Foreign Application Priority Data
Oct. 24, 2011 (KR) .................. 10-2011-0108909

(51) Int. Cl.
*G03F 7/20* (2006.01)
(52) U.S. Cl.
USPC .......................................... 430/321; 430/328
(58) Field of Classification Search
None
See application file for complete search history.

(56) References Cited

U.S. PATENT DOCUMENTS

2007/0229734 A1\* 10/2007 Ho ................................ 349/106
2011/0287366 A1\* 11/2011 Lee et al. ................... 430/285.1

FOREIGN PATENT DOCUMENTS

| JP | 10-213910 A | \* | 8/1998 |
| KR | 1020060125993 A | | 12/2006 |
| KR | 1020080082164 A | | 9/2008 |
| KR | 1020100003695 A | | 1/2010 |

OTHER PUBLICATIONS

Computer-generated translation of JP 10-213910 (Aug. 1998).\*

\* cited by examiner

*Primary Examiner* — John A. McPherson
(74) *Attorney, Agent, or Firm* — Cantor Colburn LLP (57) ABSTRACT

In a method of manufacturing a display apparatus, a first substrate including a plurality of pixels is formed, and a black column spacer is formed on the first substrate. A second substrate is formed, and a liquid crystal layer is formed between the first substrate and the second substrate. The black column spacer is formed by coating a photoresist on the first substrate, exposing the photoresist to a first light, developing the exposed photoresist and exposing the developed photoresist to a second light.

14 Claims, 5 Drawing Sheets

METHOD OF MANUFACTURING DISPLAY APPARATUS

This application claims priority to Korean Patent Application No. 10-2011-0108909 filed on Oct. 24, 2011, and all the benefits accruing therefrom under 35 U.S.C. §119, the contents of which are herein incorporated by reference in its entirety.

BACKGROUND

1. Field of the Invention

The invention relates to a method of manufacturing a display apparatus.

2. Description of the Related Art

In general, a liquid crystal display includes two substrates and a liquid crystal layer disposed between the two substrates. The liquid crystal display drives the liquid crystal layer to control a transmittance of light passing through the liquid crystal layer, thereby displaying desired images.

The liquid crystal display includes a spacer formed between the two substrates to maintain a distance between the two substrates, e.g., a cell gap. However, a separate process, such as a photolithography process, an exposure process using a transfer film, etc., is commonly used to form the spacer, which complicates a manufacturing process and increases a manufacturing cost of the display apparatus.

SUMMARY

Exemplary embodiments of the invention provide a method of manufacturing a display apparatus to simplify a manufacturing process and improve a display quality.

According to the exemplary embodiments, a method of manufacturing a display apparatus includes forming a first substrate including a plurality of pixels, forming a black column spacer on the first substrate, forming a second substrate and forming a liquid crystal layer between the first substrate and the second substrate.

The forming of the black column spacer includes coating a photoresist on the first substrate, exposing the photoresist to a first light, developing the exposed photoresist and exposing the photoresist to a second light.

The black column spacer includes a black matrix covering a portion of the pixels, and a column spacer disposed on the black matrix to maintain a distance between the first substrate and the second substrate. The black matrix and the column spacer are integrally formed with each other.

The photoresist includes at least two initiators having different maximum energy absorption wavelengths from each other, and the at least two initiators include a first initiator and a second initiator. The first and second initiators have different maximum energy absorption wavelengths from each other. The maximum energy absorption wavelength of the first initiator is longer than (i.e., at a lower energy than) the maximum energy absorption wavelength of the second initiator. The second initiator includes at least one of an ester-based initiator, an oxime-based initiator, an imidazole-based initiator or a mercaptan-based initiator.

According to the above, a manufacturing process of the display apparatus is simplified and a manufacturing cost of the display apparatus is reduced. In addition, the elution of impurity ions and defects caused by the elution of the impurity ions may be reduced or effectively prevented, thereby improving a display quality of the display apparatus.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 1:
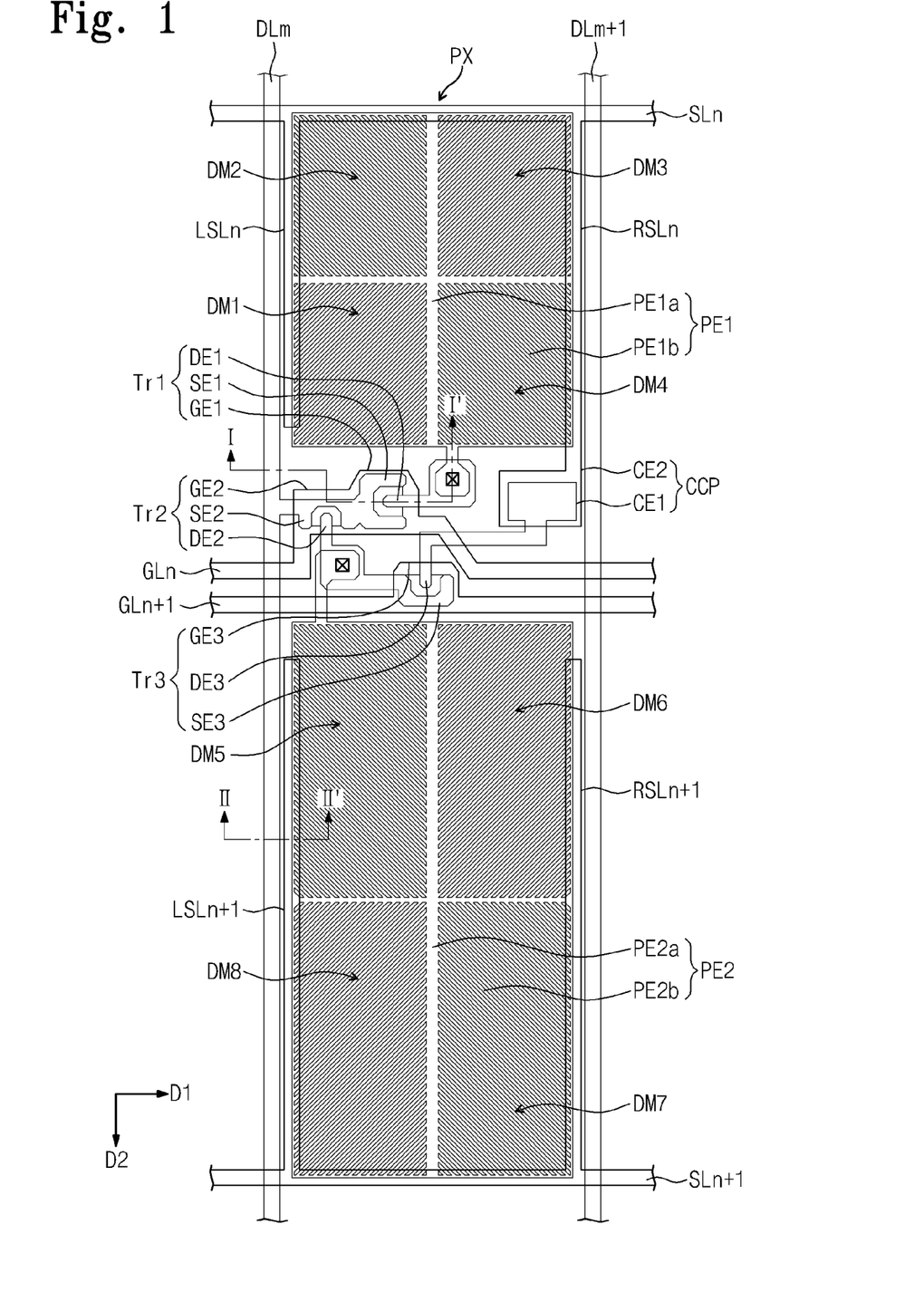
FIG. 1 is a plan view showing an exemplary embodiment of a layout of a pixel according to the invention.
Figure 2A:
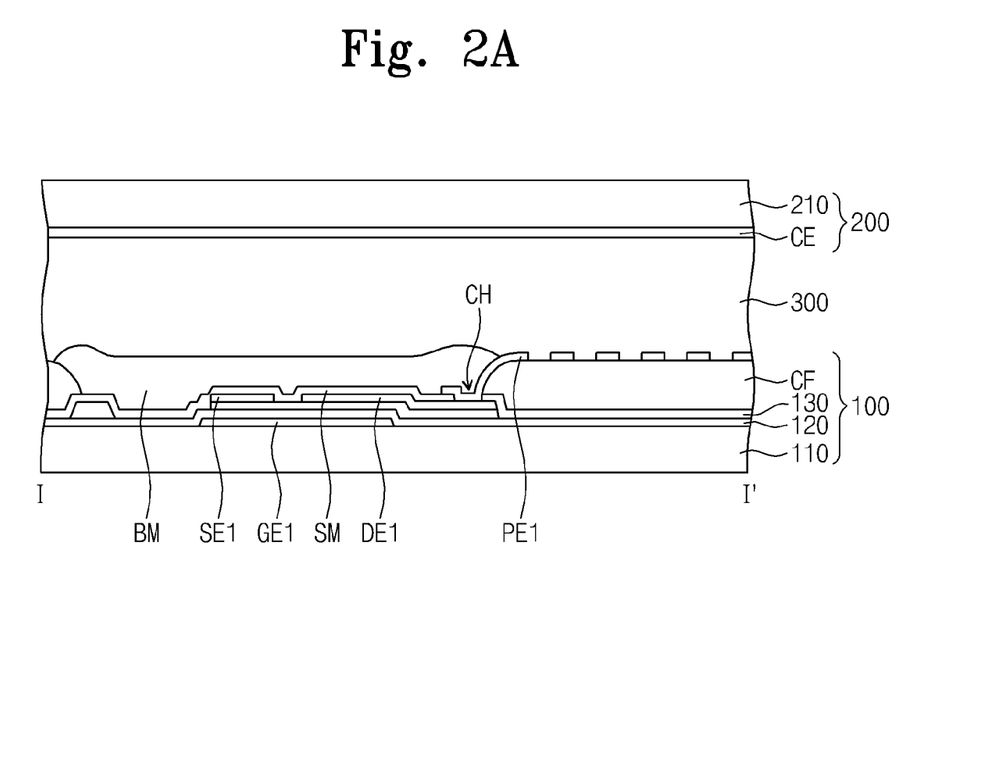
FIG. 2A is a cross-sectional view taken along line I-I' of FIG. 1.
Figure 2B:
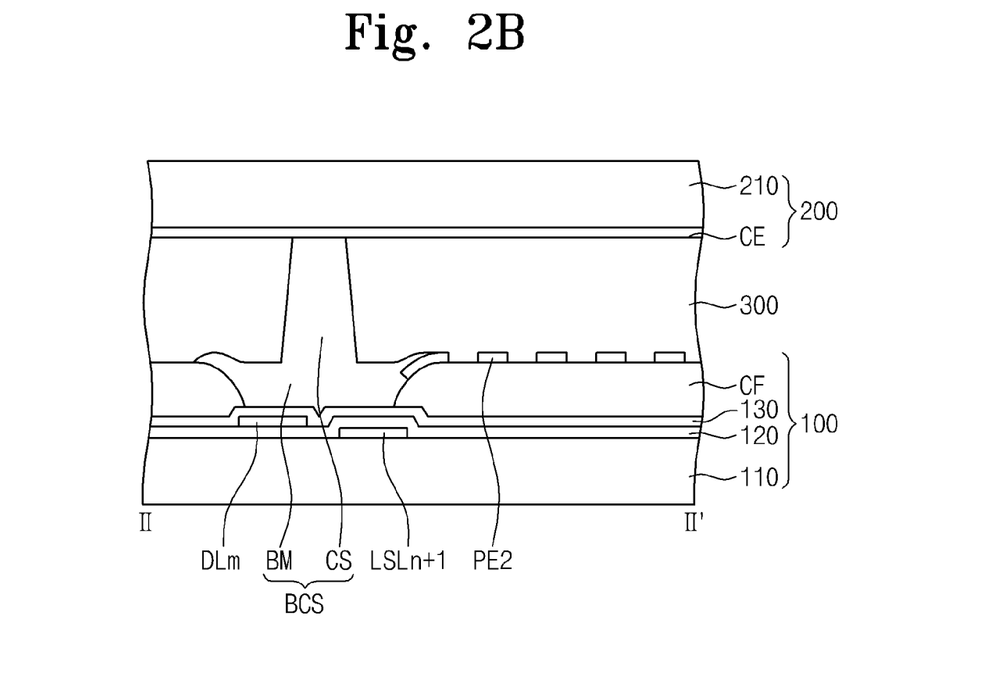
FIG. 2B is a cross-sectional view taken along line II-II' of FIG. 2.

FIG. 1 is a plan view showing an exemplary embodiment of a layout of a pixel according to the invention, FIG. 2A is a cross-sectional view taken along line I-I' of FIG. 1, and FIG. 2B is a cross-sectional view taken along line II-II' of FIG. 2. The pixel shown in FIG. 1 may have various layouts. Different from the layout of the pixel shown in FIG. 1, one pixel may be connected to one gate line and one data line, or one pixel may be connected to one gate line and two data lines according to embodiments.

Referring to FIGS. 1, 2A, and 2B, the display apparatus includes a first substrate 100, a second substrate 200 facing the first substrate 100, a black column spacer BCS disposed between the first substrate 100 and the second substrate 200 to maintain a distance between the first substrate 100 and the second substrate 200, and a liquid crystal layer 300 disposed between the first substrate 100 and the second substrate 200.

The first substrate 100 includes a first base substrate 110, a plurality of gate lines disposed on the first base substrate 110, a plurality of data lines and a plurality of pixels PX each of which is connected to a corresponding gate line of the gate lines and a corresponding data line of the data lines.

In FIGS. 1, 2A, and 2B, for the convenience of explanation, an n-th gate line GLn, an (n+1)th gate line GLn+1, an m-th data line DLm, an (m+1)th data line DLm+1, and one pixel PX have been shown. Hereinafter, the n-th gate line GLn and the (n+1)th gate line GLn+1 are respectively referred to as a first gate line and a second gate line, and the m-th data line DLm and the (m+1)th data line DLm+1 are respectively referred to as a first data line and a second data line.

The first and second gate lines GLn and GLn+1 are disposed on the first base substrate 110 and extended in a direction D1 to be substantially parallel to each other. The first and second data lines DLm and DLm+1 are disposed on the first and second gate lines GLn and GLn+1 while interposing a gate insulating layer 120 therebetween. The first and second data lines DLm and DLm+1 are longitudinally extended in a second direction D2 crossing the first direction D1 to be substantially parallel to each other. The gate insulating layer 120 is disposed on the first base substrate 110 to cover the first and second gate lines GLn and GLn+1.

Each pixel PX includes a first sub-pixel and a second sub-pixel. The first sub-pixel includes a first thin transistor Tr1, a first sub-pixel electrode PE1 and a first storage electrode part, and the second sub-pixel includes a second thin film transistor Tr2, a second storage electrode part, a third thin film transistor Tr3, a second sub-pixel electrode PE2 and a coupling capacitor CCP. The first and second sub-pixels are disposed between the first data line DLm, and the second data line DLm+1 adjacent to the first data line DLm.

The first thin film transistor Tr1 of the first sub-pixel is connected to the first data line DLm and the first gate line GLn.

The first thin film transistor Tr1 includes a first gate electrode GE1 branched from the first gate line GLn, a first source electrode SE1 branched from the first data line DLm, and a first drain electrode DE1 electrically connected to the first sub-pixel electrode PE1.

The first storage electrode part includes a first storage line SLn longitudinally extended in the first direction D1, and first and second branch electrodes LSLn and RSLn branched from the first storage line SLn and longitudinally extended in the second direction D2.

The first sub-pixel electrode PE1 is partially overlapped with the first storage line SLn, the first branch electrode LSLn and the second branch electrode RSLn to form a first storage capacitor.

The first sub-pixel electrode PE1 includes a trunk portion PE1a, and a plurality of branch portions PE1b protruded from the trunk portion PE1a and extended in radial directions with respect to the trunk portion PE1a.

The trunk portion PE1a may have a cross shape as shown in FIG. 1, and thus the first sub-pixel is divided into plural regions by the trunk portion PE1a. The first sub-pixel may be divided into plural domains by the trunk portion PE1a. The branch portions PE1b are extended in different directions according to the domains. In the exemplary embodiment, the first sub-pixel has been shown to include first, second, third, and fourth domains DM1, DM2, DM3 and DM4. The branch portions PE1b are spaced apart from each other not to make contact with each other and are substantially parallel to each other in each domain DM1, DM2, DM3 and DM4. The distance between two adjacent branch portions PE1b to each other is measured in terms of a micrometer and taken perpendicular to a direction in which the respective branch portions PE1b are extended. The above configuration is to align liquid crystal molecules of the liquid crystal layer 300 in a specific angle on a plane substantially parallel to the first base substrate 110.

The second thin film transistor Tr2 includes a second gate electrode GE2 branched from the first gate line GLn, a second source electrode SE2 branched from the first data line DLm and a second drain electrode DE2 electrically connected to the second sub-pixel electrode PE2.

The second storage electrode part includes a second storage line SLn+1 longitudinally extended in the first direction D1, and third and fourth branch electrodes LSLn+1 and RSLn+1 branched from the second storage line SLn+1 and longitudinally extended in the second direction D2.

The second sub-pixel electrode PE2 is partially overlapped with the second storage line SLn+1, the third branch electrode LSLn+1 and the fourth branch electrode RSLn+1 to form a second storage capacitor.

The second sub-pixel electrode PE2 includes a trunk portion PE2a, and a plurality of branch portions PE2b protruded from the trunk portion PE2a and extended in radial directions with respect to the trunk portion PE2a.

The trunk portion PE2a may have a cross shape as shown in FIG. 1, and thus the second sub-pixel is divided into plural regions by the trunk portion PE2a. The second sub-pixel may be divided into plural domains by the trunk portion PE2a. The branch portions PE2b are extended in different directions according to the domains. In the exemplary embodiment, the second sub-pixel has been shown to include fifth, sixth, seventh, and eighth domains DM5, DM6, DM7 and DM8. The branch portions PE2b are spaced apart from each other not to make contact with each other and are substantially parallel to each other in each domain DM5, DM6, DM7 and DM8. The distance between two adjacent branch portions PE2b to each other is measured in terms of a micrometer and taken perpendicular to a direction in which the respective branch portions PE2b are extended. The above configuration is to align liquid crystal molecules of the liquid crystal layer 300 in a specific angle on a plane substantially parallel to the first base substrate 110.

The third thin film transistor Tr3 includes a third gate electrode GE3 branched from the second gate line GLn+1, a third source electrode SE3 branched from the second drain electrode DE2 and a third drain electrode DE3 connected to a coupling capacitor electrode CE1 of the coupling capacitor CCP. The third source electrode SE3 and the second drain electrode DE2 may be a single, unitary, indivisible member. The coupling capacitor electrode CE1 and the third drain electrode DE3 may be a single, unitary, indivisible member. The coupling capacitor CCP includes the coupling capacitor electrode CE1, and an opposite electrode CE2 extended from the second branch electrode RSLn to form the coupling capacitor CCP with the coupling capacitor electrode CE1. The second branch electrode RSLn and the opposite electrode CE2 may form a single, unitary, indivisible member. However, the structure of the coupling capacitor CCP should not be limited thereto or thereby.

Referring to FIGS. 1, 2A, and 2B, the first substrate 100 further includes the gate insulating layer 120, a protective layer 130 and color filters CF.

The gate insulating layer 120 covers the first and second gate lines GLn and GLn+1 and the first to third gate electrodes GE1, GE2 and GE3.

The protective layer 130 covers the first and second data lines DLm and DLm+1, the first to third source electrodes SE1, SE2 and SE3, and the first to third drain electrodes DE1, DE2 and DE3. The protective layer 130 is provided with contact holes CH which extend therethrough to expose a portion of the drain electrodes DE1 and DE2.

The color filters CF are disposed on the protective layer 130. The color filters CF respectively correspond to the pixels PX, and each of the color filters CF has red, green or blue colors R, G or B. Although not shown in figures, a passivation layer including an inorganic or organic material may be disposed on the color filters CF.

The black column spacer BCS has a black color, and includes a black matrix BM to cover a portion of the first substrate 100 and a column spacer CS.

When viewed in a plan view, the black matrix BM is disposed between the color filters CF and overlapped with an end portion of the color filters CF. In detail, the black matrix BM covers areas between adjacent color filters CF, which correspond to the first and second gate lines GLn and GLn+1 and the first and second data lines DLm and DLm+1, and channel portions of the first, second and third thin film transistors Tr1, Tr2 and Tr3 to block unnecessary lights.

The column spacer CS is disposed on the black matrix BM to maintain the distance, e.g., the cell gap, between the first substrate 100 and the second substrate 200. The column spacer CS may be disposed on portions of the black matrix BM, which correspond to and overlap the first and second data lines DLm and DLm+1 and/or the first and second gate lines GLn and GLn+1.

The black matrix BM and the column spacer CS are integrally formed with each other, such that the black matrix BM and the column spacer CS form a single, unitary, indivisible member, and thus the black column spacer BCS may substantially simultaneously perform the function of the black matrix BM to block the light and the function of the column spacer CS to maintain the cell gap. In this case, the distance between the first substrate 100 and the second substrate 200 may be maintained in a range of about 2.0 micrometers to about 4.0 micrometers by the column spacer CS.

The second substrate 200 includes a second base substrate 210 and a common electrode CE.

The common electrode CE is disposed on the second base substrate 210. The liquid crystal layer 300 is disposed between the first substrate 100 and the second substrate 200. The liquid crystal layer 300 includes the liquid crystal molecules aligned in a vertical direction with respect to the first substrate 100 and the second substrate 200 when no electric field is formed between the pixel electrode PE and the common electrode CE. That is, the liquid crystal layer 300 may be a vertical electric field mode liquid crystal layer.

Figure 3:
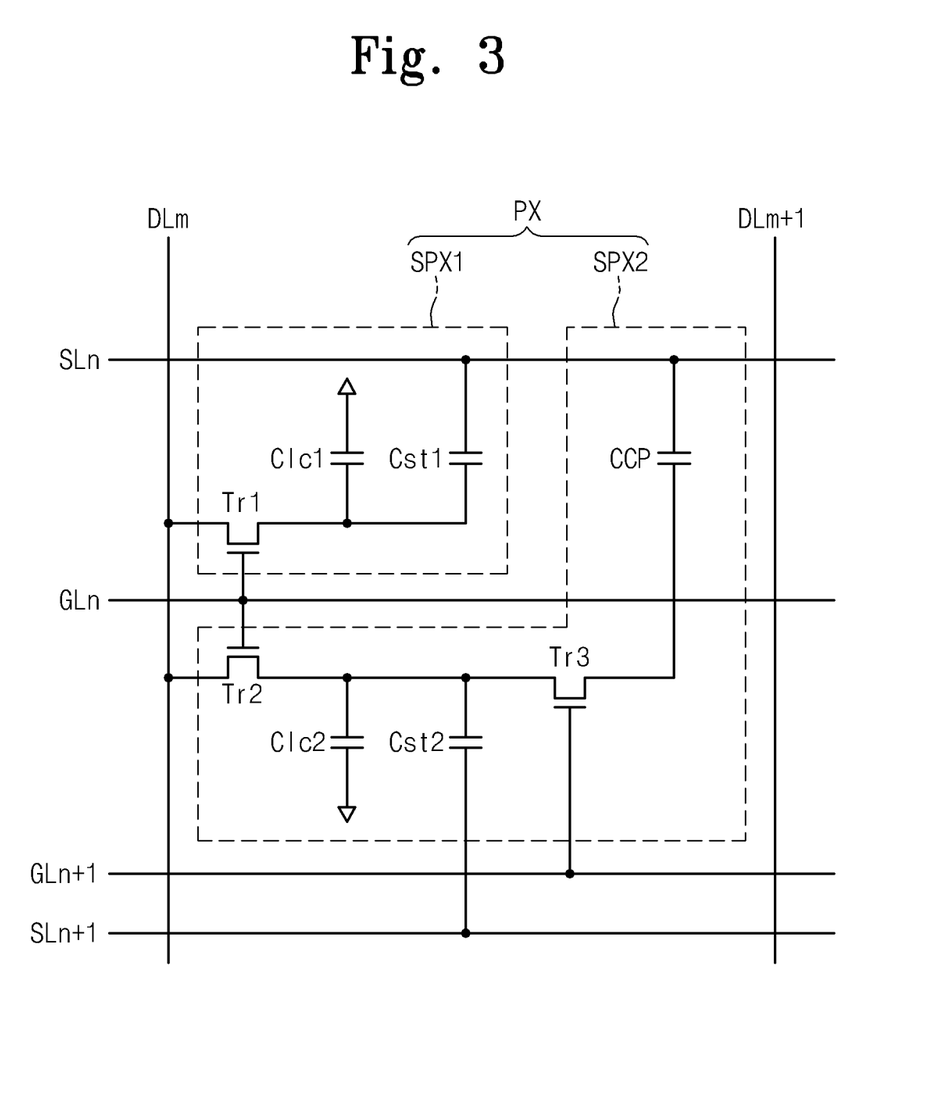
FIG. 3 is an equivalent circuit diagram showing the pixel of FIG. 1.

FIG. 3 is an equivalent circuit diagram showing the pixel of FIG. 1.

Referring to FIG. 3, each pixel PX includes the first sub-pixel SPX1 and the second sub-pixel SPX2. The first sub-pixel SPX1 includes the first thin film transistor Tr1, the first liquid crystal capacitor Clc1 and the first storage capacitor Cst1, and the second sub-pixel SPx2 includes the second thin film transistor Tr2, the second liquid crystal capacitor Clc2, the second storage capacitor Cst2, the third thin film transistor Tr3 and the coupling capacitor CCP. The first and second sub-pixels SPX1 and SPX2 are disposed between two adjacent data lines, e.g., the first data line DLm and the second data line DLm+1. In addition, the first thin film transistor Tr1 of the first sub-pixel SPX1 is connected to the first data line DLm and the first gate line GLn, and the second thin film transistor Tr2 of the second sub-pixel SPX2 is connected to the first data line DLm and the first gate line GLn.

In detail, the first thin film transistor Tr1 includes the first source electrode connected to the first data line Dm, the first gate electrode connected to the first gate line GLn and the first drain electrode connected to the first liquid crystal capacitor Clc1. The first storage capacitor Cst1 is disposed between the first drain electrode and the first storage line SLn and connected to the first liquid crystal capacitor Clc1 in parallel. The second thin film transistor Tr2 includes the second source electrode connected to the first data line DLm, the second gate electrode connected to the first gate line GLn and the drain electrode connected to the second liquid crystal capacitor Clc2. The second storage capacitor Cst2 is disposed between the second drain electrode and the second storage line SLn+1 and connected to the second liquid crystal capacitor Clc2.

When a first gate signal is applied to the first gate line GLn, the first and second thin film transistors Tr1 and Tr2 are substantially simultaneously turned on. A data voltage applied to the first data line DLm is applied to the first and second liquid crystal capacitors Clc1 and Clc2 through the turned-on first and second thin film transistors Tr1 and Tr2. Thus, the first and second liquid crystal capacitors Clc1 and Clc2 are charged with the same pixel voltage during a high period of the first gate signal.

The third thin film transistor Tr3 includes the third source electrode connected to the second drain electrode of the second thin film transistor Tr2, the third gate electrode connected to the second gate line GLn+1 and the third drain electrode connected to the coupling capacitor CCP. The second gate line GLn+1 receives a second gate signal that rises after the first gate signal falls. When the third thin film transistor Tr3 is turned on in response to the second gate signal, a voltage division occurs between the second liquid crystal capacitor Clc2 and the coupling capacitor CCP, thereby lowering the pixel voltage charged in the second liquid crystal capacitor Clc2. The lowered level of the pixel voltage charged in the second liquid crystal capacitor Clc2 may be varied according to the charge rate of the coupling capacitor CCP. Consequently, after the second gate signal is generated, the first liquid crystal capacitor Clc1 is charged with the first pixel voltage and the second liquid crystal capacitor Clc2 is charged with the second pixel voltage lower than the first pixel voltage.

Accordingly, the liquid crystal molecules in the area corresponding to the first sub-pixel electrode PE1 are inclined at an angle different from that of the liquid crystal molecules in the area corresponding to the second sub-pixel electrode PE2 since the liquid crystal molecules in the area corresponding to the first sub-pixel electrode PE1 are influenced from the electric field having an intensity different from that of the electric field exerting influence on the liquid crystal molecules in the area corresponding to the second sub-pixel electrode PE2. As a result, the liquid crystal molecules in the area corresponding to the first sub-pixel electrode PE1 have the inclination angle different from that of the liquid crystal molecules in the area corresponding to the second sub-pixel electrode PE2, and thus a phase retardation of the light may be compensated, thereby improving a side visibility. In other words, the liquid crystal molecules in the two areas form the domains having different alignment degrees toward the vertical direction, so the side visibility may be improved.

In the exemplary embodiment, the pixel including two sub-pixel electrodes has been described, but it should not be limited thereto or thereby. That is, the number of the sub-pixel electrodes of the pixel may be varied depending on the layout of the pixel according to embodiments. For instance, each pixel may be divided into plural sub-pixels and at least one sub-pixel electrode may be disposed corresponding to each pixel.

Hereinafter, a method of manufacturing the display apparatus will be described in detail with reference to FIG. 4.

Figure 4:
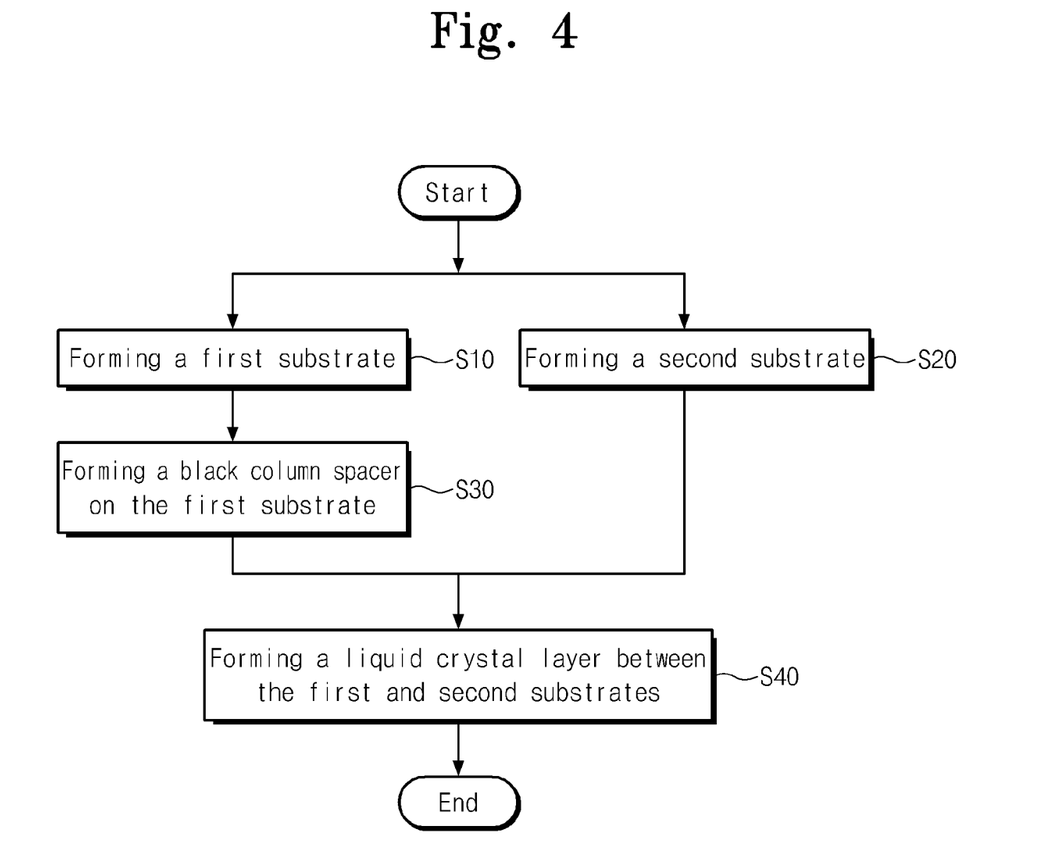
FIG. 4 is a flowchart showing an exemplary embodiment of a method of manufacturing a display apparatus according to the invention.

FIG. 4 is a flowchart showing an exemplary embodiment of method of manufacturing a display apparatus according to the invention.

Referring to FIG. 4, the first substrate is formed (S10), and then the second substrate is formed (S20). Then, the black column spacer is formed on the first substrate (S30). After that, the liquid crystal layer is formed between the first substrate and the second substrate (S40).

The process of forming the first substrate 100 will be described with reference to FIGS. 1 and 2.

A gate pattern is formed on the first base substrate 110. The gate pattern includes the first and second gate lines GLn and GL+1, the first, second and third gate electrodes GE1, GE2 and GE3, and the storage electrode part. The gate pattern may be formed using a photolithography process.

The gate insulating layer 120 is formed on the first base substrate 110 to cover the gate pattern.

A semiconductor layer SM is formed on the gate insulating layer 120. The semiconductor layer SM may include an active pattern, and an ohmic contact layer formed on the active pattern. The semiconductor layer SM may be formed using a photolithography process.

A data pattern is formed on the semiconductor layer SM. The data pattern includes the first and second data lines DLm and DLm+1, the first, second and third source electrodes SE1, SE2 and SE3, and the first, second and third drain electrodes DE1, DE2 and DE3. The data pattern may be formed using a photolithography process. In this case, the semiconductor layer SM and the data pattern may be formed by using a single half-mask or a diffraction mask.

The protective layer 130 is formed on the data pattern. The protective layer 130 includes the contact holes CH formed extending completely therethrough to expose the portions of the first and second drain electrodes DE1 and DE2. The protective layer 130 may be formed by the photolithography process.

The color filters CF are formed on the protective layer 130. The color filters CF correspond to the pixels PX, respectively, and each color filter CF may have the red, green or blue color R, G or B. The color filters CF may be formed through various methods, such as a deposition method, a coating method, an inkjet method, etc. Although not shown in figures, the passivation layer including the organic material or the inorganic material may be further formed on the color filters CF.

The pixel electrode PE is formed on the color filters CF to be connected to the first and second drain electrodes DE1 and DE2 through the contact holes CH. The pixel electrode PE includes the first sub-pixel electrode PE1 and the second sub-pixel electrode PE2, and the first and second sub-pixel electrodes PE1 and PE2 are connected to the first and second drain electrodes DE1 and DE2, respectively. The pixel electrode PE may be formed using a photolithography process.

The second substrate 200 is prepared by forming the common electrode CE on the second base substrate 210. The common electrode CE is formed by a photolithography process.

The black column spacer BCS is formed on the first substrate 100. The black column spaces BCS may be considered part of the first substrate 100 or a member separate from the first substrate 100.

Figure 5:
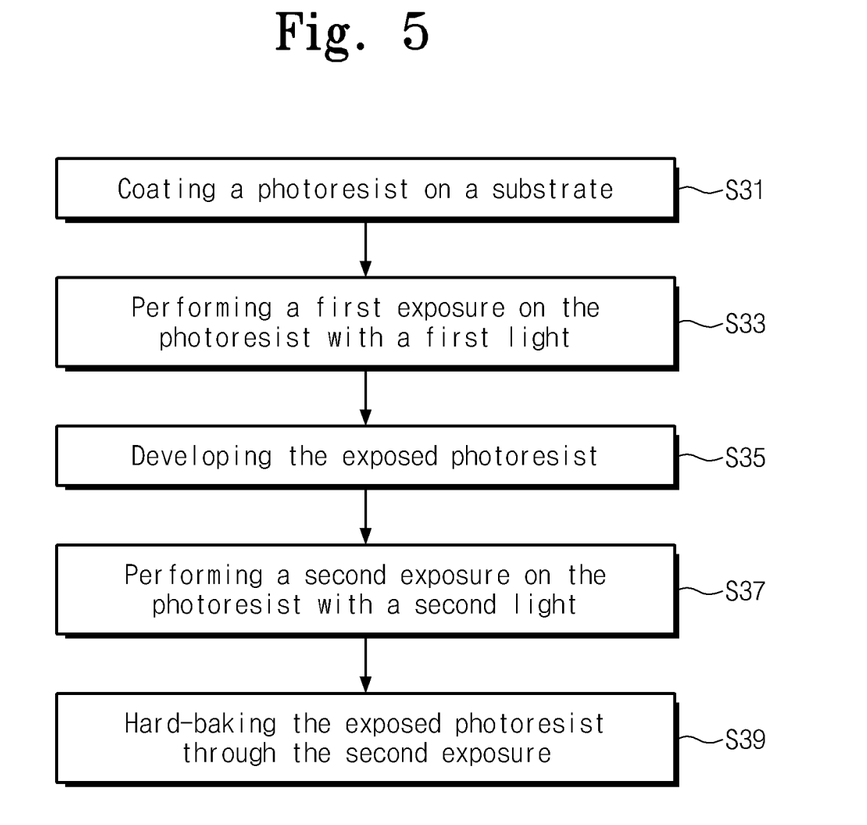
FIG. 5 is a flowchart showing an exemplary embodiment of a method of forming a black column spacer.

FIG. 5 is a flowchart showing an exemplary embodiment of a method of forming a black column spacer.

As shown in FIG. 5, a photoresist is coated on the first substrate 100 (S31). The photoresist includes a photosensitive organic material having the black color. The photosensitive organic material causes a polymerization reaction or a degradation reaction when it is exposed to the light. In the exemplary embodiment, the photoresist may include carbon black, organic/inorganic pigment or colored mixture pigment to represent the black color.

The photoresist may be a negative photoresist. In the case of the negative photoresist, a portion not exposed to the light is removed through a development process.

The photoresist includes two or more initiators reacting to different maximum energy absorption wavelengths from each other. In detail, the photoresist includes a first initiator, and a second initiator having the maximum energy absorption wavelength (λmax) different from that of the first initiator. The first and second initiators make the reaction degrees of the photoresist appear to be different from each other according to the wavelength of the light irradiated to the photoresist.

The first initiator has the maximum energy absorption wavelength (λmax) greater than about 300 nanometers (nm) and equal to or smaller than about 600 nm.

The first initiator should not be limited to a material having the above-mentioned maximum energy absorption wavelength (λmax), and thus the first initiator may be a titanocene-based initiator or an acetophenone-based initiator. The titanocene-based initiator may be a compound represented by Formulas 1, and the acetophenone-based initiator may be a compound represented by Formulas 2A or 2B.

Formula 1

Formula 2A

Formula 2B

Table 1 shows the maximum energy absorption wavelength (λmax) of the first initiator according to the exemplary embodiment.

TABLE 1

| First initiator | Structural formula | λmax (nm) |
|---|---|---|
| 1 | | 550 |
| 2 | | 300~310 |

TABLE 1-continued

| First initiator | Structural formula | λmax (nm) |
|---|---|---|
| 3 | | 320~330 |

The second initiator may have the maximum energy absorption wavelength (λmax) from about 200 nm to about 300 nm.

The second initiator should not be limited to a material having the above-mentioned maximum energy absorption wavelength (λmax), and thus the second initiator may include at least one of an ester-based initiator, an oxime-based initiator, an imidazole-based initiator, or a mercaptan-based initiator.

The ester-based initiator, the oxime-based initiator, the imidazole-based initiator and the mercaptan-based initiator may be a compound respectively represented by the following Formulas 3 to 6.

Formula 3

Formula 4

Formula 5

Formula 6

Table 2 shows the maximum energy absorption wavelength (λmax) of the second initiator according to the exemplary embodiment.

TABLE 2

| Second initiator | Structural formula | λmax (nm) |
|---|---|---|
| 1 | | 240~250<br>320~335 |
| 2 | | 265<br>297<br>330 |
| 3 | | 240<br>326 |
| 4 | | 260<br>298<br>337 |

TABLE 2-continued

| Second initiator | Structural formula | λmax (nm) |
|---|---|---|
| 5 | (structure: bis-imidazole with chlorophenyl and phenyl substituents) | 269 |
| 6 | (structure: 2-mercaptobenzothiazole, N=C-SH) | 250<br>321 |

The photoresist may be pre-baked (e.g., a soft bake) before the next exposure process is carried out.

Then, a mask is disposed on the first substrate 100 and a first light is irradiated on a predetermined area of the photoresist through the mask to perform a first exposure process (S33). The first light has a wavelength greater than about 300 nm and equal to or smaller than about 600 nm to correspond to the maximum energy absorption wavelength (λmax) of the first initiator. When the first light is irradiated on the photoresist, the polymerization reaction or the degradation reaction occurs on the photoresist by the first initiator.

The predetermined area corresponds to the area in which the black column spacer BCS is formed. In the first exposure process, the slit mask or the diffraction mask may be used as the mask such that the amount of the light irradiated on the area in which the black matrix BM is formed becomes different from the amount of the light irradiated on the area in which the column spacer CS is formed. In one exemplary embodiment, for instance, when the diffraction mask or the slit mask is used on the assumption that the area in which the black column spacer BCS is not formed, the area in which the black matrix BM is formed, and the area in which the column spacer CS is formed are respectively referred to as first, second, and third areas, the light does not pass through the first area. In addition, a portion of the light passes through the second area or is diffracted, and all the light passes through the third area.

Then, the photoresist exposed through the first exposure process is developed (S35). Accordingly, a portion of the photoresist remains and the other portion of the photoresist is removed according to the exposure amount in the first exposure process. In one exemplary embodiment, for instance, the photoresist in the first area is completely removed, the photoresist in the second area is partially removed and the photoresist in the third area is not removed. Thus, the photoresist in the second area has a height greater than a height of the photoresist in the first area, and the photoresist in the third area has a height greater than the height of the photoresist in the first area.

After that, a second light is irradiated on the developed photoresist through a second exposure process (S37). The second light has a wavelength from about 200 nm to about 300 nm corresponding to the maximum energy absorption wavelength (λmax) of the second initiator. When the second light is irradiated on the developed photoresist, the polymerization reaction or the degradation reaction further occurs on the photoresist by the second initiator.

The exposure amount of the photoresist by the second light during the second exposure process is smaller than the exposure amount of the photoresist by the first light during the first exposure process. The polymerization reaction or the degradation reaction further occurs by the second exposure process, and thus the profile of the column spacer CS may be controlled. That is, when an angle between the side surface of the column spacer CS and the upper surface of the first substrate 100 or the first base substrate 110 is referred to as a taper angle, the taper angle may be controlled according to the exposure amount during the second exposure process.

Table 3 shows the value of the taper angle according to the exposure amount of the second exposure process. As shown in Table 3, as the exposure amount in millijoules (mJ) increases, the value of the taper angle in degrees) (°) increases.

TABLE 3

| Exposure amount | No exposure | Exposure amount during second exposure process (mJ) | | | | | |
|---|---|---|---|---|---|---|---|
| | | 5 | 10 | 20 | 30 | 50 | 100 |
| Taper angle (°) | 10 | 16 | 34 | 40 | 47 | 51 | 55 |

The exposure amount of the photoresist during the second exposure process may be controlled according to the value of the taper angle. For instance, the second exposure process may be performed to irradiate the second light on the photoresist in the exposure amount from about 2 mJ to about 25 mJ since the liquid crystal molecules are mis-operated when the taper angle is too large.

The second exposure process is performed to cause the additional reactions of the second initiator after the first exposure process and the main pattern is formed by the first exposure process, and thus a separate mask for the second exposure process is not needed.

Then, the photoresist applied with the second exposure process is post-baked (e.g., a hard bake), thereby forming the black column spacer BCS (S39).

When the photoresist is post-baked without performing the second exposure process on the photoresist, a flow phenomenon in which the photoresist is flown by the heat during the post-bake process, may occur. Thus, the width of the column spacer CS is rapidly increased by the flow phenomenon. In addition, due to the flow phenomenon, a compression property of the column spacer CS is deteriorated and a boundary of the black matrix BM is indistinct. However, in the exemplary embodiment, the photoresist is further exposed through the second exposure process, thereby preventing the occurrence of the flow phenomenon.

Next, the liquid crystal layer is formed between the first substrate on which the black column spacer is formed and the second substrate (S40).

In the exemplary embodiment of the method of manufacturing the display apparatus according to the invention, the black matrix and the column spacer, which are integrally formed with each other, may be formed by using one mask. Accordingly, the elution of impurity ions and defects caused by the elution of the impurity ions, which are generated when two masks are applied to form the black matrix and the column spacer, may be reduced or effectively prevented. In addition, since one mask is used to form the black matrix and the column spacer, a manufacturing process of the display apparatus is simplified and a manufacturing cost of the display apparatus is reduced. Further, since the column spacer is formed in the area in which the black matrix is formed and the column spacer and the black matrix are integrally formed with each other, the transmittance of the display apparatus may be improved.

A display apparatus structure including an integral column spacer and black matrix which overlap each other may be formed by forming a photoresist including two initiators having different maximum energy absorption wavelengths (λmax) from each other. The integral column spacer and black matrix which overlap each other is considered a structural characteristic of the final display apparatus. Since the integral column spacer and black matrix which overlap each other is imparted by the photoresist having specific material characteristics, e.g., the two initiators, during a manufacturing process, such manufacturing process of forming the photoresist is considered to impart the distinct characteristic of the integral column spacer and black matrix which overlap each other.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

For instance, in the exemplary embodiment, the negative photoresist has been described, but it should not be limited thereto or thereby. That is, a positive photoresist may be used instead of the negative photoresist.

In addition, the method of forming the column spacer may be used to form an organic layer having a step difference in a predetermined area. As an example, the method of forming the column spacer may be applied to form a barrier wall of a pixel in an organic light emitting display apparatus.

Further, in the exemplary embodiment, the display apparatus employing the liquid crystal layer has been described as a representative example, but the display apparatus should not be limited thereto or thereby. That is, the display apparatus may employ an organic light emitting layer, an electrophoretic layer, an electrowetting layer, or a microelectromechanical system shutter layer instead of the liquid crystal layer.

What is claimed is:

1. A method of manufacturing a display apparatus, the method comprising:
    forming a first substrate including a plurality of pixels;
    forming a black column spacer on the first substrate;
    forming a second substrate; and
    forming a liquid crystal layer between the first substrate and the second substrate,
    wherein the forming of the black column spacer comprises:
        coating a photoresist on the first substrate, the photoresist comprising a first initiator and a second initiator;
        exposing the photoresist to a first light which corresponds to the first initiator;
        developing the exposed photoresist; and
        exposing the developed photoresist to a second light which corresponds to the second initiator,
        wherein the first and second initiators have different maximum energy absorption wavelengths from each other.

2. The method of claim 1, wherein the black column spacer comprises:
    a black matrix which overlaps a portion of the pixels; and
    a column spacer on the black matrix, wherein the column spacer maintains a distance between the first substrate and the second substrate.

3. The method of claim 2, wherein the black matrix and the column spacer are a single, unitary, indivisible member.

4. The method of claim 3, wherein the forming the first substrate comprises:
    forming a thin film transistor on a first insulating substrate;
    forming a protective layer which overlaps the thin film transistor;
    forming a color filter on the protective layer; and
    forming a pixel electrode which is connected to the thin film transistor.

5. The method of claim 4, wherein the color filter is provided in a plural number and the color filters respectively correspond to the pixels such that the pixels display different colors from each other.

6. The method of claim 5, wherein the black column spacer is between adjacent color filters.

7. The method of claim 1, wherein the maximum energy absorption wavelength of the first initiator is longer than the maximum energy absorption wavelength of the second initiator.

8. The method of claim 7, wherein the first light has a wavelength corresponding to the maximum energy absorption wavelength of the first initiator and the second light has a wavelength corresponding to the maximum energy absorption wavelength of the second initiator.

9. The method of claim 8, wherein the second initiator comprises at least one of an ester initiator, an oxime initiator, an imidazole initiator or a mercaptan initiator.

10. The method of claim 9, wherein the second initiator is at least one compound of the following formulas, 11. The method of claim 1, wherein an amount of the first light is greater than an amount of the second light.

12. The method of claim 1, wherein the photoresist is a negative photoresist.

13. The method of claim 1, further comprising baking the photoresist after the developed photoresist is exposed to the second light.

14. The method of claim 1, wherein the liquid crystal layer is a vertical electric field mode liquid crystal layer.

* * * * *